Patented May 1, 1951

2,551,050

UNITED STATES PATENT OFFICE 2,551,050

CONDENSATION PRODUCTS OF AROMATIC HYDROCARBONS AND SYMMETRICAL DICHLOROACETONE AND PROCESS FOR PRODUCING SAME

John T. Pinkston, Jr., Euclid, Ohio, assignor to Universal Oil Products Company, Chicago, Ill., a corporation of Delaware No Drawing. Application August 3, 1946, Serial No. 688,339

9 Claims. (Cl. 260—63)

This application is a continuation-in-part of my co-pending application Serial No. 489,807, filed June 5, 1943.

This invention relates to a process for preparing resins by interacting aromatic hydrocarbons and at least one member of the group consisting of $a,a'$-dihalo ketones and alkylene dihalides in the presence of a Friedel-Crafts metal halide catalyst.

An object of this invention is to form a resin suitable for incorporating into surface coating materials by reacting aromatic compounds having at least two replaceable nuclear hydrogen atoms per molecule with a dihalogenated organic compound selected from the members of the group consisting of $a,a'$-dihalo ketones and alkylene dihalides.

Another object of this invention is to form a resin by condensing an aromatic hydrocarbon having at least two replaceable nuclear hydrogen atoms per molecule with a dihalogenated organic compound selected from the group consisting of $a,a'$-dihalo ketones and alkylene dihalides.

Still another object of this invention is to form a resin by condensing a benzene hydrocarbon having two replaceable nuclear hydrogen atoms with symmetrical dichloroacetone in the presence of a Friedel-Crafts halide catalyst.

A further object of this invention is a resinous composition formed by reacting a dialkyl benzene hydrocarbon, a symmetrical dihalo ketone and an alkylene dihalide in the presence of a Friedel-Crafts halide catalyst.

One specific embodiment of my invention relates to a process for producing resins which comprises condensing an aromatic hydrocarbon having at least two replaceable nuclear hydrogen atoms, an $a,a'$-symmetrical dihalo ketone, and an alkylene dihalide in the presence of a Friedel-Crafts halide catalyst.

Another embodiment of my invention relates to a process for producing a resin which comprises reacting an aromatic hydrocarbon containing at least two replaceable hydrogen atoms with a symmetrical dichloro ketone in the presence of a Friedel-Crafts metal chloride catalyst.

A further embodiment of my invention comprises a resinous product formed by reacting a condensible benzene hydrocarbon, a symmetrical dihalo ketone and an alkylene dihalide in the presence of a Friedel-Crafts metal halide catalyst.

The preparation of high molecular weight organic material, varying in properties from viscous oils to resinous solids, by the condensation of aromatic hydrocarbons and alkylene dihalides, such as ethylene dichloride, has been known for some time. I have found that a new resinous material, having a softening point above 200° F. (93.3° C.) and suitable for incorporation into surface coating materials may be prepared by reacting aromatic hydrocarbons having two replaceable hydrogen atoms with symmetrical dihalogenated ketones in the presence of a Friedel-Crafts metal halide catalyst.

Other related resinous compositions are also obtained by applying my process to the condensation of condensible aromatic hydrocarbons, dihalogenated ketones, and alkylene dihalides in the presence of a Friedel-Crafts metal halide catalyst. The resultant high molecular weight polyketone resins may be used as such in the preparation of coating materials and varnishes or they may be modified further by reaction with polyamines or with aliphatic aldehydes such as, for example, formaldehyde, acetaldehyde, crotonaldehyde, and the like, or alkyl ketones in the presence of a condensation catalyst whereby cross linkages may be formed between molecules of high molecular weight polyketone with a resultant increase in the molecular weight and softening point of the resultant product.

Aromatic hydrocarbons used in my process may be either pure aromatic hydrocarbons, aromatic-containing hydrocarbon fractions, certain substituted aromatic hydrocarbons, or mixtures of these. The hydrocarbon fractions suitable for use in the process may be those within the gasoline boiling range, the boiling range of kerosene or other heavier hydrocarbon stocks. For use in my process the aromatic hydrocarbon must contain at least two replaceable hydrogen atoms. Such aromatic hydrocarbons thus include benzene, toluene, xylenes, ethylbenzene, diethylbenzene, and more highly alkylated benzene hydrocarbons having not more than 4 alkyl groups per molecule. Naphthalene, alkylated naphthalenes and other polycyclic aromatic hydrocarbons having at least two replaceable nuclear hydrogen atoms are also utilizable in this process. The alkyl substituents of these various alkylated benzene hydrocarbons and polycyclic aromatic hydrocarbons preferably contain one or two carbon atoms, as alkyl groups of longer carbon atom length often undergo scission during the process and the olefinic hydrocarbons which are formed from the alkyl groups so split off from the alkyl aromatic hydrocarbon undergo polymerization reactions. The aromatic compounds utilizable in my process may also contain nuclear halogen substituents, particularly fluorine, chlorine, or bromine. Thus monochlorobenzene may be used or dichlorobenzene, or chlorotoluene, fluoroxylenes, and the like.

All of the different aromatic compounds which may be employed in my process will not give equivalent results. Thus, aromatic hydrocarbons having only two replaceable nuclear hydrogen atoms react with alkylene dihalides and symmetrical dihalo ketones to form resins with a linear structure while other aromatic hydrocarbons containing three or four replaceable nuclear hydrogen atoms react with alkylene dihalides and symmetrical dihalo ketones to form a cross-linked resinous material.

Symmetrical dihalo acetone, particularly $a,a'$-symmetrical dichloroacetone, is the dihaloketone preferred for use in my process for producing resins, but other $a,a'$-dihalogen substituted ketones may be used similarly. These different $a,a'$-symmetrical dihalogenated ketones may be represented by the formula:

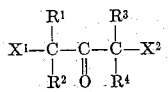

wherein each of $R^1$, $R^2$, $R^3$ and $R^4$ represents a member of the group consisting of hydrogen, an alkyl radical, a cycloalkyl radical, and an aralkyl radical, and $X^1$ and $X^2$ represent halogens, particularly chlorine and bromine.

Ethylene dichloride, more exactly referred to as 1,2-dichloroethane, is the simplest alkylene dihalide used as a reactant in my process. This alkylene dihalide which is reacted with aromatic hydrocarbons and dihalogenated ketones may be represented by the formula:

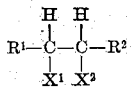

wherein each of $R^1$ and $R^2$ represents a member of the group consisting of a hydrogen atom, an alkyl radical, a cycloalkyl radical and an aralkyl radical, and $X^1$ and $X^2$ each represents halogen, generally chlorine.

The Friedel-Crafts halide catalysts used in my condensation process include particularly metal halides, such as aluminium chloride, aluminum bromide, bismuth chloride, ferric chloride, zinc chloride, stannic chloride, mercuric chloride, etc. These catalysts may also be used in mixtures with one another or with a solvent such as a nitroparaffin, a low boiling paraffinic hydrocarbon, etc. Sometimes it is convenient to deposit the active catalyst upon a supporting or carrying material, such as crushed porcelain, pumice, fire-brick, silica, diatomaceous earth, alumina, activated carbon, etc., and then use the supported catalyst in granular form as a reactor packing material.

In carrying out my process an aromatic hydrocarbon of the type herein set forth is reacted with an $a,a'$-di-haloketone at a temperature and for a time sufficient to form a product which, when decomposed with water and separated from the unreacted starting material, is a soft plastic substance. The temperature used in effecting this reaction is from about 60° to about 115° C. and is preferably about 100° C. After the aromatic hydrocarbon and haloketone are so reacted, the resultant reacted mixture is decomposed with water and the aqueous layer is separated from the organic layer. The unreacted symmetrical dihaloketone is removed, for example, by extraction with a solvent, as acetone, and the plastic residue is heated to a temperature of from about 200° to about 300° C. to drive off water. The resultant product upon cooling, sets quickly to a hard, clear, resin.

I have found that this first step of the reaction must be carefully controlled in order to avoid charring in the last step of the process. Completion of the first reaction step is indicated by an increase in the viscosity of the reaction mixture accompanied by a slight swelling. If the condensation reaction is continued beyond this point, the product, after hydrolysis and separation from unreacted material, is a hard, brittle, opaque, and slightly soluble resin which chars on heating. If the primary reaction is stopped before the indicated point, the product after hydrolysis is a viscous liquid which may be converted, however, to a resinous material by further heating.

Instead of employing an $a,a'$-symmetrical dihalo ketone alone with the aromatic hydrocarbon, an alkylene dihalide, such as ethylene dichloride or another alkylene dihalide of the type mentioned herein may be admixed with the dihaloketone such as symmetrical dichloroacetone. By using such a combination of reactants, resins may be formed having properties intermediate between those formed by employing either only the alkylene dihalide or the dihaloketone with the aromatic hydrocarbon. Resins formed by combining the three reactants, that is aromatic hydrocarbon, dihaloketone, and alkylene dihalide are more soluble in organic solvents, have better adherence to glass and metal surfaces and improved flexibility over those formed by reacting the aromatic hydrocarbon with only one type of the dihalo compounds, as well as better water-resistance than those formed from the dihaloketones and aromatic hydrocarbons alone.

Also these resins may be made by reacting the aromatic compound with from about 1 to about 5 molecular proportions of dihalo-compounds selected from the group consisting of dihaloketones and alkylene dihalides, at least 10 per cent of said dihalo-compounds being dihaloketones. The use of the ketonic component in the production of the resins has the advantage that the resultant resin has improved solubility in oxygenated solvents and better compatibility with drying oils, oxygenated plasticizers and other oxygen-containing resins.

The resinous reaction products are soluble in organic solvents such as toluene, carbon tetrachloride, petroleum fractions, such as petroleum naphthas, and also natural drying oils such as linseed oil, and synthetic drying oils.

The following examples are given to illustrate results of my process although these illustrations are given with no intention of restricting unduly the broad scope of the invention.

*Example I*

23.8 parts by weight of a mixture of xylenes containing ortho, meta, and para xylenes, 18.9 parts by weight of aluminum chloride and 57.1 parts by weight of symmetrical dichloroacetone were heated in a rotatable steel autoclave at about 100° C. for nine hours. The resultant reaction mixture was decomposed with water and separated into unreacted starting materials and a plastic residue of resin-like material. This plastic residue was heated until frothing ceased and a clear, hard resinous product was obtained with a melting point of 99° C. by the ball and ring method.

*Example II*

Another reaction mixture, comprising one molecular proportion of mixed xylenes, 0.5 molecular proportion of symmetrical dichloroacetone and 0.5 molecular proportion of ethylene dichloride in the presence of aluminum chloride catalyst at about 90° C. yields a plastic material which after further heating is converted into a hard resinous product of somewhat lighter color than that described in Example I.

The nature of the present invention and its utility are evident from the preceding specification and examples, although neither section is introduced to limit unduly the generally broad scope of the invention.

I claim as my invention:

1. A process for producing resins which comprises reacting a xylene, an alkylene dichloride, and symmetrical dichloroacetone at a temperature of from about 60° C. to about 115° C. and in the presence of a Friedel-Crafts metal halide catalyst.

2. A process for preparing resins which comprises reacting a xylene, ethylene dichloride, and symmetrical dichloroacetone in the presence of aluminum chloride and at a temperature of from about 60° C. to about 115° C.

3. A process for preparing resins which comprises reacting xylene with symmetrical dichloroacetone in the presence of aluminum chloride and at a temperature of from about 60° C. to about 115° C.

4. A process for producing resins which comprises reacting a xylene with symmetrical dichloroacetone at a temperature of from about 60° C. to about 115° C. and in the presence of a Friedel-Crafts metal halide catalyst.

5. A composition of matter comprising the condensation product of a xylene and symmetrical dichloroacetone, said product being a hard, clear resin having a softening point above about 200° F.

6. A process for producing resins which comprises reacting an aromatic hydrocarbon having at least two replaceable nuclear hydrogen atoms with symmetrical dichloroacetone at a temperature of from about 60° C. to about 115° C. and in the presence of a Friedel-Crafts metal halide catalyst.

7. A composition of matter comprising the condensation product of an aromatic hydrocarbon having at least two replaceable nuclear hydrogen atoms and symmetrical dichloroacetone, said product being a hard, clear resin having a softening point above about 200° F.

8. A process for producing resins which comprises reacting an aromatic hydrocarbon having at least two replaceable nuclear hydrogen atoms, symmetrical dichloroacetone and ethylene dichloride at a temperature of from about 60° C. to about 115° C. and in the presence of a Friedel-Crafts metal halide catalyst.

9. A composition of matter comprising the condensation product of an aromatic hydrocarbon having at least two replaceable nuclear hydrogen atoms, symmetrical dichloroacetone and ethylene dichloride.

JOHN T. PINKSTON, Jr.

REFERENCES CITED

The following references are of record in the file of this patent:

UNITED STATES PATENTS

| Number | Name | Date |
|---|---|---|
| 2,235,860 | Williams | Mar. 25, 1941 |
| 2,238,638 | Gleason | Apr. 15, 1941 |
| 2,323,898 | D'Alelio | July 13, 1943 |

OTHER REFERENCES

Fuson: Jour. Amer. Chem. Soc., vol. 60, pages 2935–2936 (1938).